United States Patent [19]
Wells et al.

[11] Patent Number: 5,765,601
[45] Date of Patent: Jun. 16, 1998

[54] TIRE INFLATOR AND SEALANT PRODUCT

[75] Inventors: James D. Wells, Indian Trial; Horst Abramowski, Matthews, both of N.C.

[73] Assignee: Radiator Specialty Company, Charlotte, N.C.

[21] Appl. No.: 245,099

[22] Filed: May 17, 1994

[51] Int. Cl.$^6$ ............................................. B65D 83/20
[52] U.S. Cl. .................. 141/38; 222/382; 222/402.13; 222/402.15; 222/464.1; 222/4; 137/223
[58] Field of Search ............................. 141/38; 222/382, 222/402.1, 402.13, 402.15, 402.19, 464.1, 4; 137/223; 156/97

[56] References Cited

U.S. PATENT DOCUMENTS

| | | | |
|---|---|---|---|
| 2,498,596 | 2/1950 | Wallach | 222/3 |
| 2,812,783 | 11/1957 | Bufogle | 141/38 |
| 2,856,104 | 10/1958 | Spiess, Jr. et al. | 222/402.13 X |
| 2,943,766 | 7/1960 | Orr | 222/394 |
| 3,096,002 | 7/1963 | Focht | 222/402.15 |
| 3,113,698 | 12/1963 | Abplanalp | 222/402.1 |
| 3,130,519 | 4/1964 | Mauget . | |
| 3,305,144 | 2/1967 | Beres et al. | 222/402.13 |
| 3,395,838 | 8/1968 | Beres et al. | 222/402.13 |
| 3,448,779 | 6/1969 | Horwitt | 141/38 |
| 3,495,922 | 2/1970 | Steinman . | |
| 3,843,586 | 10/1974 | Wolf | 141/38 |
| 3,907,012 | 9/1975 | Burke | 137/223 X |
| 4,054,163 | 10/1977 | Brown, Jr. et al. . | |
| 4,168,015 | 9/1979 | Robinette | 222/3 |
| 4,278,188 | 7/1981 | Stephenson et al. | 222/182 |
| 4,350,299 | 9/1982 | Stephenson et al. | 239/337 |
| 4,576,303 | 3/1986 | Mundt et al. | 220/89.2 |
| 4,776,500 | 10/1988 | Ford | 222/402.1 |
| 4,899,826 | 2/1990 | Penn | 141/38 X |
| 4,901,891 | 2/1990 | Goncalves | 222/402.13 |
| 4,941,600 | 7/1990 | Berriochoa et al. | 222/402.13 |
| 5,124,395 | 6/1992 | Abramowski et al. | 524/462 |
| 5,305,784 | 4/1994 | Carter | 137/223 X |
| 5,403,417 | 4/1995 | Dudley et al. | 156/97 |

FOREIGN PATENT DOCUMENTS

| | | | |
|---|---|---|---|
| 249756 | 2/1964 | Australia | 141/38 |
| 509789 | 3/1952 | Belgium | 141/38 |

*Primary Examiner*—J. Casimer Jacyna
*Attorney, Agent, or Firm*—Bell Seltzer Intellectual Property Law Group Alston and Bird LLP

[57] ABSTRACT

A product for inflating a pneumatic tire including an enhanced delivery system is disclosed according to the present invention. The tire inflating product includes a container containing a condensed gas and a sealant, and a flexible conduit extending outwardly from a first end of the container in a direction parallel to the longitudinal axis of the container. The free end of the conduit is adapted to be connected to a valve stem of a tire and, typically, includes a threaded coupling with a valve depressor. The container includes a valve assembly on one end for releasing the contents of the container and an actuator is provided for actuating the valve assembly to release the container contents through the conduit.

34 Claims, 3 Drawing Sheets

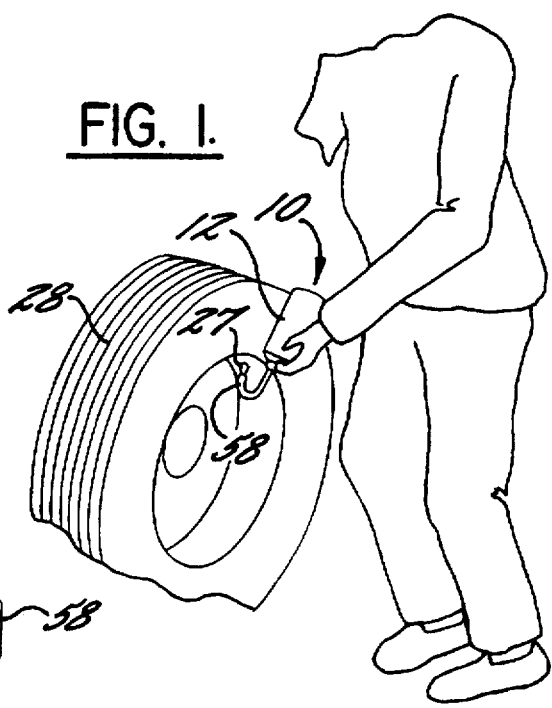
FIG. 1.
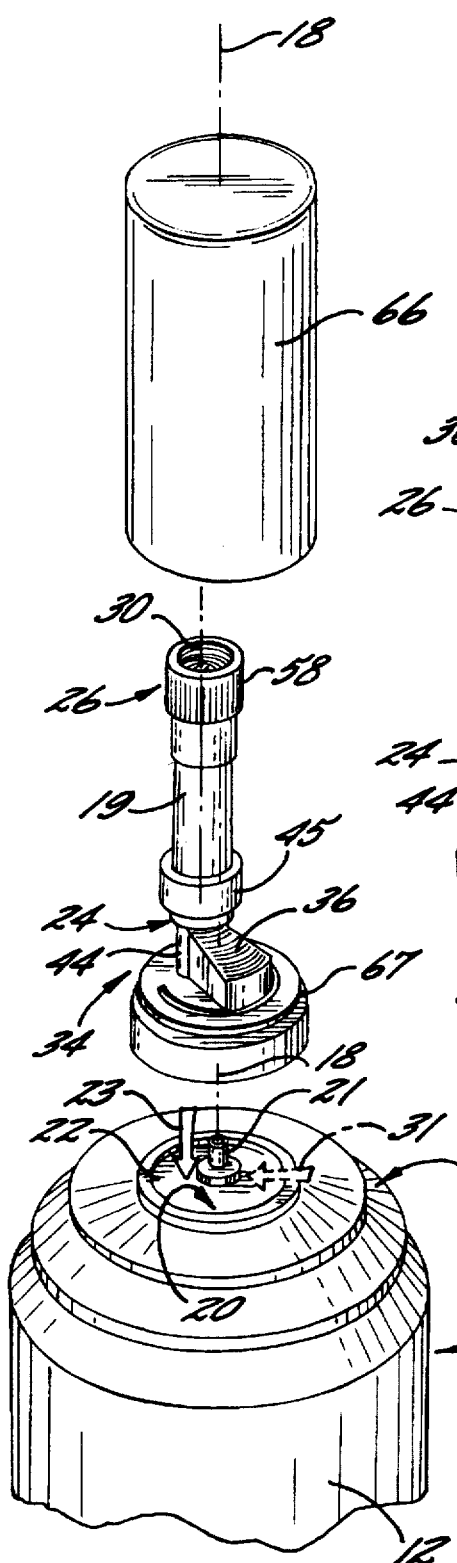
FIG. 2.
FIG. 3A.
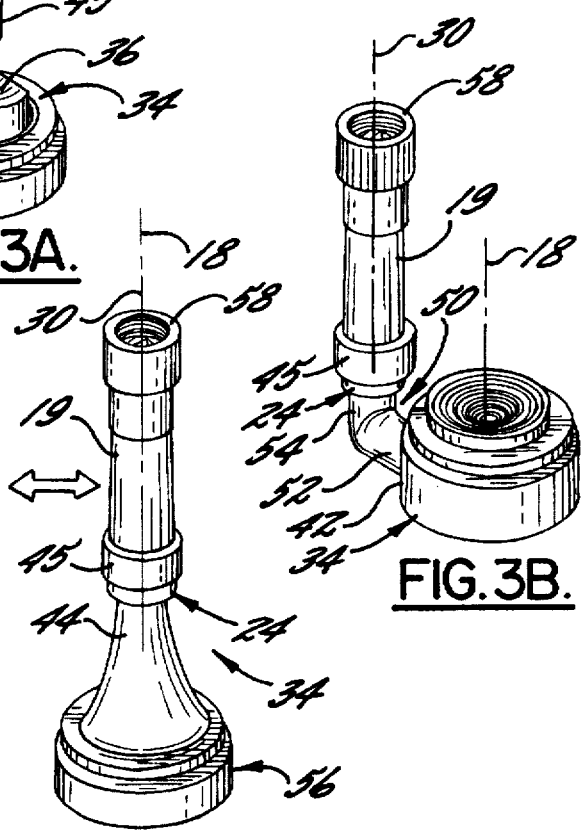
FIG. 3B.
FIG. 3C.

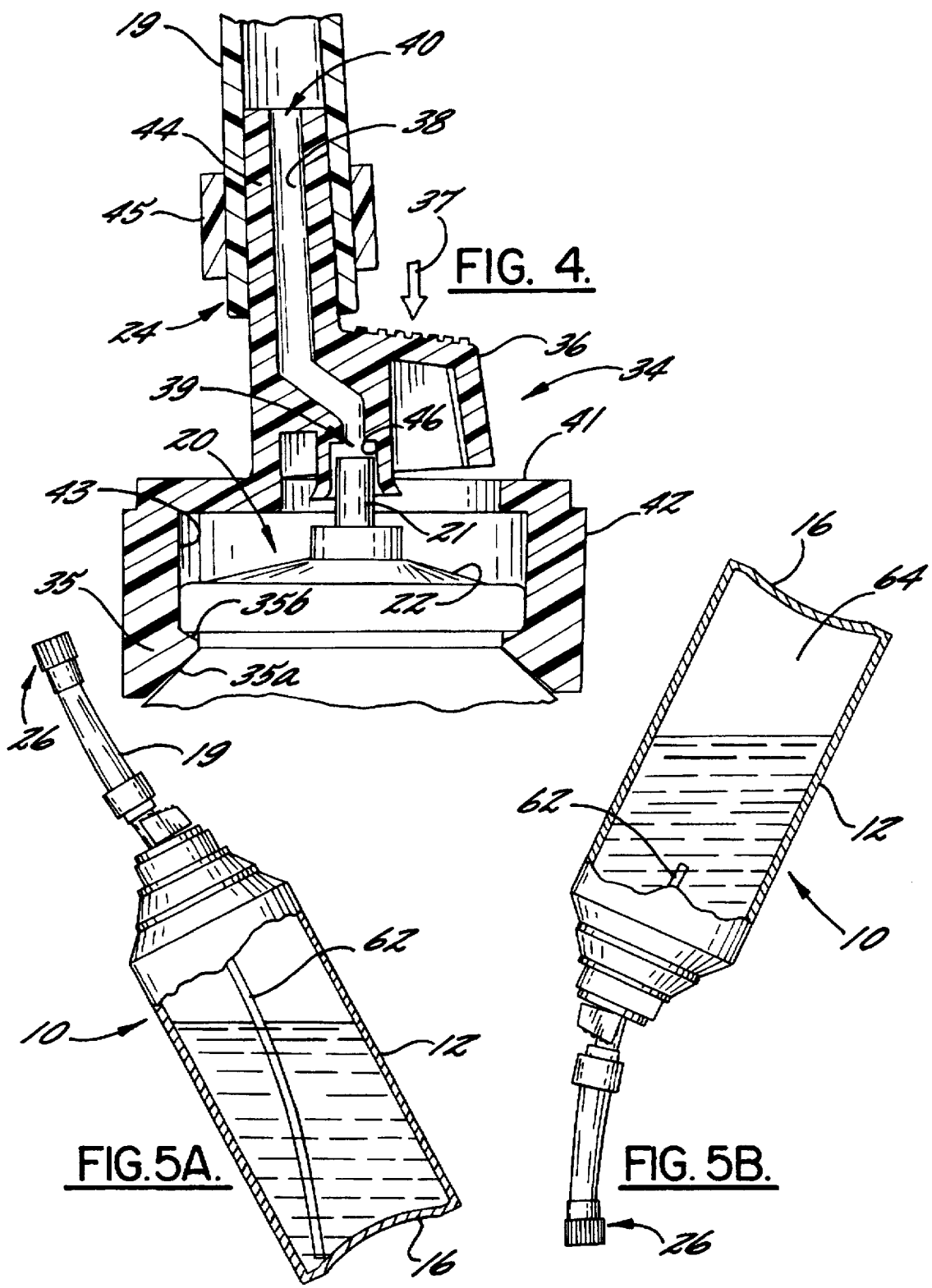

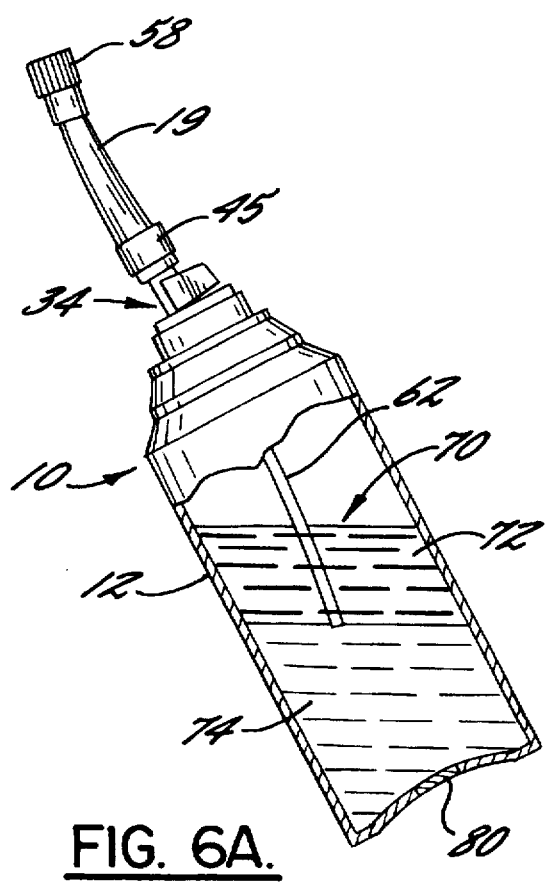
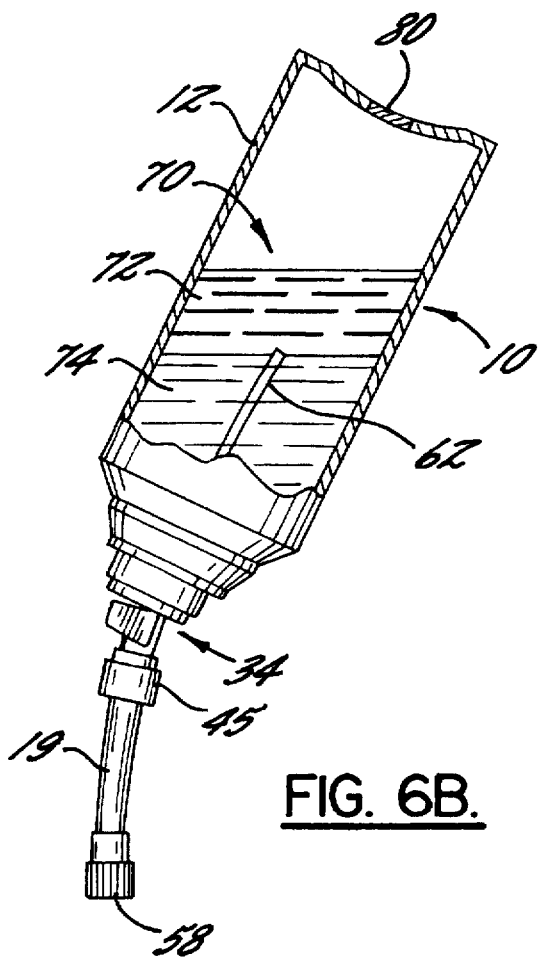
FIG. 6A.
FIG. 6B.

TIRE INFLATOR AND SEALANT PRODUCT

FIELD OF THE INVENTION

The invention relates to tire inflator products of the type including pressure retaining containers and associated delivery systems for delivering to the interior of a tire, expandable compositions adapted to inflate, and typically seal, the tire or a tube within the tire. The invention also relates to improved non-flammable, non-ozone depleting tire sealant and inflation products.

BACKGROUND OF THE INVENTION

Currently available pneumatic tires are designed to perform for relatively long periods of time. In many cases, automobile tires are now expected to have a useful service life of 30,000, 50,000 or 70,000 miles. However, even long-life pneumatic tires are subject to failure due to puncture by nails and other sharp objects.

In response to consumer distress over flat tires and the associated ordeal of changing the damaged tire, tire sealant and inflator compositions together with associated delivery devices have been developed. The inflator and sealant compositions are typically packaged in a relatively small metal container of the type known to consumers as an "aerosol can". The inflator and sealant compositions generally include a condensed, i.e. 'liquified', gas containing a glue-like sealant material. A sufficient quantity of condensed gas is typically provided in the container so that as the liquid changes state to a gas upon discharge from the interior of the container into a flat tire, it expands with sufficient volume and force to re-inflate the tire to a drivable condition. At the same time, the glue-like sealant material is distributed onto the interior surface of the tire and "finds" the puncture in the tire because of pressurized gas leaking through the puncture. This, in turn allows the sealant material to react with air and seal the puncture.

Because these self-contained tire inflating and sealant products are portable and can be stored in a vehicle's trunk for use in an emergency, and because many of these devices have proven reliable and relatively easy to use, the devices have achieved enormous commercial success, with sales amounting to millions of dollars annually. In a relatively short period of time these devices have generated an industry, such that numerous companies presently manufacture and supply large quantities of portable tire inflating products. These products are regularly stocked in a wide variety of retail stores throughout the United States and other countries.

Over the years, various changes have been made in the inflator and sealant compositions. Particularly desirable tire inflator and sealant compositions are disclosed in U.S. Pat. No. 5,124,395, issued Jun. 23, 1992 to the same inventors as in the present case. These inflator and sealant compositions are both non-flammable and non-ozone depleting. In preferred embodiments, these compositions include the combination of condensed 1,1,1,2-tetrafluoroethane (Refrigerant 134a) as an inflator-propellant, an aqueous latex sealant, and a vapor point depressant that effectively lowers the vapor pressure of the condensed gas in the container.

Substantial changes have also been made to the delivery systems for discharging the inflator and sealant compositions into damaged tires. One delivery system that has been sold with considerable commercial success is known in the trade as the "cone top" system. The cone top system includes a cone shaped actuator assembly, typically formed of a plastic or another relatively rigid material, mounted onto the container holding the inflator and sealant composition under pressure. This actuator is positioned over the conventional valve stem of the container which controls release of the materials from the container. The cone-shaped actuator extends upwardly from the end of the pressurized container and terminates at an exterior end configured for attachment to the valve stem of a pneumatic tire. The cone top actuator also includes an internal valve linkage assembly that mechanically connects the interior of the container to the interior of the tire as the delivery end of the actuator is connected to valve stem of the tire by simultaneously opening both the aerosol valve and the tire valve.

The cone top tire inflating dispensing systems, and similar mechanical linkage dispensing systems, are found in practice to suffer from various problems. For example, breakage of the stem on the aerosol valve is common during the manufacturing process as the actuator is attached to the container. Similarly, misalignment of the actuator and the container valve during the manufacturing process can damage the actuator and render it useless. These dispensers can be difficult for the consumer to use because of the amount of turning required to connect the container to the tire, and container leakage due to various problems can also be problematic. For example, the minor difference in shape between the aerosol valve pedestal (on the top of the container body) and the inner surface of the cone top actuator, can cause leakage within the actuator nozzle during the actuation cycle. In some cases the press fit connection between the skirt of the actuator and the metal crimp on the container body can be too loose with the result that the actuator cannot be threaded onto the tire valve. In other cases, cross-threading of the actuator top onto the tire valve complicates or prevents removal of the actuator from the tire valve following use of the product. In addition, because the actuator nozzle is rigid, relatively short and wide, it cannot readily be attached to valve stems found on some configurations of tires and wheels, e.g., spoked wheels, or wheels with spoked covers.

Still further, because of the inflexible construction of the automatically acting dispensing systems, and because the pressurized containers are designed for use in a predetermined orientation, either upright or inverted, proper use of the product requires the stem of a flat tire be oriented within a relatively narrow range of acceptable positions. Operation in the predetermined orientation is required because aerosol-type containers, including those used to dispense inflator and sealant materials, are normally designed to dispense materials from either the top or bottom of the container. Tire inflator products designed to dispense from the bottom of the container include a dip tube extending from the interior end of the container valve body downwardly into a lower portion of the pressurized container and dispense the condensed gas and sealant from the pressurized container when the pressurized container is held in an upright position. Products designed to dispense from the top of the container include relatively short dip tubes which terminate in an upper portion of the pressurized container, or do not have a dip tube, and dispense the condensed gas and sealant from the pressurized container when the pressurized container is held in an inverted position. In either case, if the container is held in the wrong position when the valve is actuated, headspace gas can be dispensed instead of a gas-concentrate mixture of the inflator and sealant compound.

Accordingly, the pressurized container must be properly oriented, according to instructions on the can body, in order that the condensed gas and sealant be properly dispensed. The rigidity of the nozzle of the automatic, mechanical linkage type dispensing systems, however, requires that the container body be oriented in the direction of the tire's valve stem as the nozzle is attached to the tire. In turn, this requires that the valve stem of the tire be properly positioned facing either upwardly or downwardly so that the container can be properly oriented as directed on the container. However, some consumers do not read and/or follow directions for the tire inflating devices and, consequently, do not properly position the valve stem of the flat tire to allow proper operation of the container. In other cases, consumers either will not or are hesitant to move a vehicle having a flat tire in order to properly position the valve stem of the deflated tire to allow proper operation of the tire inflating device.

Due to these and other problems, the majority of the tire inflating products are now sold in combination with conduit-type dispensing systems which were first introduced in about the early 1980's. The general configuration of conduit-type actuators used in these products can be seen in U.S. Pat. No. 4,941,600 issued Jul. 17, 1990 to Berriochoa (although the actuator locking device disclosed therein is not normally used with tire inflator products). These tire inflating products employ a side oriented actuator overlying the valve stem of the pressurized container that includes an internal fluid passageway connecting the valve stem with a port in a sidewall of the actuator body. The actuator also includes a trigger tab overlying the valve stem of the container which is designed to move the valve stem to an open position upon application of manual pressure thereto, by e.g. the finger or thumb of the consumer.

A relatively long flexible conduit is connected at one end to the actuator body for dispensing the discharged contents of the container. The second end of the flexible conduit includes a threaded coupling designed for attachment to the valve stem of a pneumatic tire. In separate steps, the consumer attaches the conduit to the valve stem of the tire, and then depresses the trigger of the actuator to initiate discharge of the inflator and sealant composition into the tire. Because of the long conduit, attachment of the device to valve stems of spoked wheels is easier. The long flexible conduit also allows the container to be maintained in the proper orientation, (normally upright), regardless of the orientation of tire's valve stem. These tire inflating products have also been found in practice to substantially reduce the leakage problems associated with the automatically acting cone top dispensers.

Although these dispensing systems have greatly reduced leakage and other problems, they have also caused problems in the automated manufacturing operation. Although automated assembly equipment is normally used to fill the container with condensed gas and tire sealant, and to attach a valve assembly and an actuator to the filled container body, no commercially available automated equipment has been found capable of properly and repeatedly aligning, and then attaching, actuators which include the long, laterally extending conduit. Instead, the actuator with the laterally extending conduit must be manually mounted on the pressurized container. Repeated attempts by equipment manufacturers and by tire inflator product manufacturers, to modify known automated equipment for use with these caps have been unsuccessful.

In addition, the flexible conduit also causes two additional manual steps to be introduced into the manufacturing operation. Because it is undesirable to leave the conduit hanging loosely from the actuator, it must be temporarily bound to the sidewall of the pressurized container, typically by manual placement of a rubber band over both the container and conduit. This step alone can require an extra 20-30 employees for an average speed manufacturing line. Thereafter, the finished tire inflator products are normally hand packed for shipping because the loosely attached conduits prevent machine handling. Still further, in the retail environment, the conduit-type dispensers can be difficult to arrange neatly on shelves, and can also take up increased amounts of shelf space as compared to other products of the same size.

Despite these drawbacks, the benefits associated with the conduit-type tire inflator products have been substantial and have resulted in widespread acceptance of the conduit-type products by tire inflation product manufacturers, retailers, and especially consumers. Thus, the improved reliability, the reduction in defects and leakage problems, and enhanced ease of use by the consumer, have in actual practice, apparently offset the problems of added manual labor, increased manufacturing time and costs, and the handling difficulties associated with these products.

SUMMARY OF THE INVENTION

The present invention provides inflating products including an enhanced delivery system for inflating pneumatic tires, tubes, and other pneumatic vessels and containers. These inflating products can be assembled using automated manufacturing equipment while also providing the benefits and advantages of the prior art conduit-type tire inflator products. The tire inflator products of the invention do not require special handling and packing steps as are associated with the conventional conduit-type tire inflator products, and can be displayed in retail stores without the problems associated with the conduit-type products. In preferred configurations the tire inflator products of the invention cannot often be used without requiring squatting or kneeling for use by the consumer, and can also minimize or eliminate wrist cramping and finger fatigue as are often associated with the conduit-type dispensers. Nevertheless, the tire inflator products of the invention avoid or minimize the problems of reliability, defective actuator seating, difficulty of use, and leakage associated with the automatically acting mechanical linkage tire inflator products.

Preferred tire inflator products of the invention include a container body containing a condensed tire inflating gas, advantageously in combination with a tire sealant, and a relatively short, flexible dispensing conduit extending from the dispensing end of the container body upwardly from the top of the container body and preferably in a direction substantially parallel to the longitudinal axis of the container. One end of the conduit is connected in fluid communication with the valve assembly of the container body. The other end of the conduit, i.e., the end remote from the container body, terminates in a coupling that attaches to the valve stem of a pneumatic tire or a like inflatable body without triggering operation of the valve assembly of the container. An actuator is advantageously provided for connecting the conduit to the container body and for actuation of the valve assembly of the container body to release the condensed tire inflating gas from the container into the short, flexible conduit. The actuator operates independently of the coupling on the terminating end of the conduit. Preferably the short, flexible conduit and the actuator form portions of an actuator assembly that can be attached to the container body in a single manufacturing step by "snap" fit, friction fit, or the like. Advantageously, the valve assembly of the container body can be vertically acting valve assembly, or a tilt action valve assembly.

Because the flexible conduit of the tire inflator products of the invention is relatively short, problems associated with automated handling and sorting of the preferred actuator assemblies can be minimized. Moreover, because the orientation of the short conduit is normally in a direction opposite to the orientation of the bottom face of the actuator body, axial sorting and/or aligning of a plurality of actuator assemblies can also result in orientation of the actuators in the proper direction for attachment to filled container bodies. In addition no separate manufacturing step is needed to temporarily attach the conduits to the side of the container body because the short, axially oriented conduits on the tire inflator products of the invention do not substantially interfere with machine handling of the products. Moreover, the relatively small size and upright orientation of the conduit allow for packaging of the products without any special manipulation or protection of the conduit. However, when protection of the conduit is desired, this can be accomplished in the conventional manner with a protective cover cap over the conduit. The flexible conduit, even though relatively short, can provide for easy attachment to wheels of various shapes, such as spoked wheels, and for orientation of the container body in the proper predetermined direction, e.g., substantially upright or inverted, even though the coupling of the conduit is attached to a tire valve stem oriented in a different direction. However because coupling of the conduit to a tire valve does not automatically trigger operation of the container valve, product leakage and usage problems are avoided or minimized.

In another aspect of the invention, a tire inflating product is provided that can effectively be used in either an upright or inverted position. In accordance with this aspect of the invention the tire inflating sealant composition in the container body is provided as a substantially stratified liquid in which the sealant portion of the composition is present primarily in an upper strata of the composition. An intermediate length dip tube extends into the container body from the valve assembly of the container and terminates in a central portion of the container so that liquid in the central portion of the container body is preferentially discharged upon actuation of the valve assembly. Because the sealant portion of the composition floats to an upper strata of the liquid in the container regardless of the container orientation, the sealant is expelled from the container during an early phase of the discharge process thereby improving distribution of the sealant within the interior of the tire and minimizing the possibility that substantial amounts of sealant might uselessly remain in the container after the propellant has been fully discharged from the container. Accordingly, the need to add costly additives to improve mixing of the sealer and inflator can be minimized or eliminated and the resultant container can be used in substantially any orientation.

In accordance with yet another aspect of the invention, high pressure non-flammable, non-ozone depleting propellant compositions, such as those disclosed in the previously mentioned U.S. Pat. No. 5,124,395, issued Jun. 23, 1992, can readily be used in tire inflator products with minimal or no need for use of a vapor pressure depressant. These compositions are placed into a metal container body having a volume of 33 cubic inches or less and having a construction capable of providing a burst pressure of at least about 370 psig but which is fitted with a pressure relief device, such as a rupturable metal plug having a burst pressure of about 250 psig or less, so that the burst pressure of the container is determined by the lower burst pressure of the pressure relief device. Although these containers have been approved by the U.S. Department of Transportation (DOT) for use in transporting Refrigerant 134a, they have not been previously approved or used for tire inflator sealant compositions. However use of these container bodies according to the present invention allows the elimination or a substantial decrease in the need for vapor pressure depressant additives. Although inert, non-ozone depleting propellant compositions such as Refrigerant 134a are typically poor solvents and thus do no mix well with sealant, preferably these propellants and these container bodies are used in combination with the intermediate length dip tube constructions of the invention, discussed above. Accordingly, a water-based sealant which is either not dissolved in, or is poorly mixed with the propellant, is readily dispensed from the container.

BRIEF DESCRIPTION OF THE DRAWINGS

In the drawings which form a portion of the original disclosure of this application:

FIG. 1 is a perspective view illustrating use of one preferred tire inflating apparatus of the present invention;

FIG. 2 is an exploded perspective view of the tire inflating apparatus of FIG. 1;

FIGS. 3A–3C are perspective views of three different embodiments of advantageous tire inflating apparatus of the invention in which the attachment of the flexible conduit to the valve assembly and/or the dispensing cap is varied;

FIG. 4 is a cross-sectional view of the apparatus shown in FIGS. 1,2 and 3A, and illustrates, in detail, one preferred dispenser cap and flexible conduit that can be used in the apparatus of the invention;

FIGS. 5A and 5B are cross-sectional views of two embodiments of the tire inflating apparatus of the invention in which the dip tubes are relatively short or relatively long, respectively, to define, in turn, an inverted and an upright operative position, respectively, for the tire inflating apparatus; and FIGS. 6A and 6B are cross-sectional views of another tire inflating apparatus of the invention constructed for effective use in either an upright or inverted position, in which an intermediate length dip tube is used in combination with a stratified inflator and sealant composition.

DETAILED DESCRIPTION OF THE PREFERRED EMBODIMENTS

In the drawings and the following detailed description, preferred apparatus embodiments of the invention are described in detail. Although the invention is described with reference to these specific preferred embodiments, it will be understood that the invention is not limited to these preferred embodiments. But to the contrary, the invention includes numerous alternatives, modifications and equivalents as will become apparent from the consideration of the foregoing discussion and the following detailed description.

FIGS. 1 and 2 illustrate one preferred tire inflating apparatus 10 in accordance with the invention. As illustrated, the apparatus 10 includes a container body 12, capable of retaining and transporting a condensed gas under pressure. These containers, known as "aerosol cans", are generally cylindrical in shape and normally formed of metal; have a relatively small inside diameter, preferably 3 in or less; a relatively small volume, preferably 50 cu. in. or less (27.7 fluid ounces or less); and are generally capable of withstanding an internal pressure of at least about 180 p.s.i.g. Preferably the container bodies meet or exceed U.S. DOT 2P specifications (43 Code of Federal Regulations, Sect. 178.33) which require a minimum wall thickness of 0.007 in. and that the container body not burst at internal pressures less than 240 psig. More preferably the container bodies meet or exceed DOT 2Q specifications (Title 43, Code of Federal Regulations) which require a minimum wall thickness of 0.008 in. and that the container body not burst at internal pressures less than 270 psig.

The container body 12 has opposed first and second, i.e., top and bottom, ends 14 and 16, respectively, and defines a longitudinal axis 18 extending therethrough. A conduit 19 extends upwardly from the discharge end of the container in a direction generally parallel to the axis 18 of the container 12. While a standard cylindrical container is illustrated in the drawings, it will be apparent to those skilled in the art that containers having other shapes can also be employed in the apparatus of the invention.

A conventional valve assembly 20 is mounted on and partially within the upper end of the container body 12 to maintain the pressurized materials within the container body and to dispense the materials when desired. As is well known in the art, the valve assembly 20 includes a valve stem 21 extending upwardly from a valve mounting cup 22 which forms a portion of the top 14 of the container 12 and defines the discharge end thereof. The valve assembly 20 is constructed according to any of various conventional designs that normally include a stem 21 arranged for movement in a predetermined direction for opening and closing thereof. The valve 20 of FIG. 2 can advantageously be a vertical action valve having a closed position when the stem 21 is disposed in a raised position as seen in FIG. 2. Conversely, when the stem 21 is moved downwardly in the direction shown by arrow 23, the valve 20 opens to release the contents of the pressurized container 12 through the interior of stem 21.

The conduit 19, is preferably formed of a tubular body which is sufficiently flexible along at least a portion of its length to allow delivery of a pressurized inflator composition in a variety of different directions. One end 24 of the conduit 19 is connected with the container body 12 in fluid communication with the stem 21 of valve assembly 20. The second end 26 of the conduit is adapted for connection to a valve stem 27 of a tire 28. Preferably the conduit is flexible substantially along its entire length and is advantageously formed of a resilient material, typically a polymer, such as polyvinyl chloride, high density polyethylene, low density polyethylene, polypropylene, or the like. In its relaxed or nominal position, the flexible conduit 19 has a longitudinal axis 30 extending substantially parallel to the longitudinal axis 18 of the container body 12 as shown in FIGS. 2 and 3A–3C. Although the conduit 19 can be flexed from its nominal position during use as shown in FIG. 1, the conduit 19 returns to its upstanding nominal position following removal of the external forces responsible for flexing of the conduit 19. The conduit 19 is preferably relatively short, and has a length of between about one inch and about 6 inches, more preferably has a length less than about 5 inches, and most preferably has a length between about 1.5 and about 4 inches.

As indicated previously, the valve assembly 20 can be of any of the various types used in the art for maintaining materials under pressure within a container body 12. Such valve assemblies include both male and female vertically acting valve assemblies which include an internal stem gasket (not shown) associated with an exterior or interior stem orifice 21 (in the case of a male or female valve, respectively), and a biasing member such as a spring and a spring cup or valve body (not shown) that cooperate to maintain the stem in a normally closed position in which one or more orifices communicating between the stem 21 and the interior of the container 12 are sealed. When manual pressure is applied to the stem 21 in a downward direction, the orifices are unseated from the gasket allowing the pressurized contents within the container to flow outwardly through the valve assembly 20, and in the case of the male valve assembly, through the interior of the stem 21.

It will be apparent that other valve assemblies can also be used with the tire inflating apparatus of the invention. Such valve assemblies can take various forms as will also be apparent. One particularly preferred alternative valve assembly contemplated for use in the invention is a tilt valve assembly. Tilt valve assemblies are also known in the art and normally include an internal or external stem 21 communicating with the interior of the pressurized container via one or more orifices arranged to open upon the application of lateral pressure to the stem 21 as indicated by the phantom arrow 31 shown in FIG. 2. In general, the tilt, vertically acting, and similar valve assemblies 20 normally include an interior or exterior valve stem 21, mounted in a mounting cup 22 for movement from a closed position to an open position for discharging the contents of the pressurized container 12 through one or more orifices associated with the valve stem 21.

Movement of the stem 21 for opening of the valve assembly 20 to provide controlled dispensing of the contents of the pressurized container 12 is accomplished by any of various one-piece, multiple piece actuators which are normally arranged to apply pressure in a predetermined direction to the stem 21 as a result of the application of pressure to all or a portion of the actuator by a consumer. In one preferred embodiment of the present invention, the actuator is provided as a portion of a multiple piece dispensing actuator 34 which is constructed for attachment by snap fit, friction fit, or the like, to the mounting cup 22 of the valve assembly which forms a portion of the top end 14 of the pressurized container 12. One preferred snap fit mechanism is shown in FIG. 4 as the lower collar member 35 of actuator 34. This collar includes a lower, upwardly radially tapered surface 35a, having an angle of about 60° which snaps over a circumferential metal seam, known as a chime, on the can body. A second tapered surface 35b disposed above the lower tapered surface 35a, tapers at an angle of about 30° to hold the actuator in contact with the can chime once attached thereto.

Once attached to the container body, the actuator is disposed in overlying relationship with the stem 21 of the valve assembly 20 as shown in FIG. 4. The actuator 34 includes an trigger tab 36 which is either integrally formed in the actuator body or formed separately and fixedly attached to the actuator body. The trigger tab 36 is positioned and arranged to pivot from an upper to a lower position as a result of the application of external axial force, typically from the finger or thumb of a consumer, as generally indicated by arrow 37. The downward movement of actuator tab, in turn, applies force to stem 21 of the valve assembly 20 as will be apparent.

The preferred actuator 34 also includes an internal passageway 38 that connects an intake port 39 with a discharge port 40 integrally formed in the body of the actuator 34. The body of the actuator 34 includes an upper surface 41 and sidewalls 42 depending from the periphery of the upper surface 41, and also includes a cavity 43 shaped for attachment to the mounting cup 22 of the valve assembly 20. As shown in cross section in FIG. 4, the intake port 39 of actuator 34 is preferably defined by an internal bore 46 having a predetermined diameter for receiving the exterior periphery of the valve stem 21 in fitting engagement.

Accordingly, the discharge port 40 of the actuator is arranged in fluid communication with stem 21 of the valve assembly 20 via the internal fluid passageway 38 to provide for discharge of the contents of the container 12 through the valve assembly 20 and out of the actuator through the discharge port 40.

Advantageously, the actuator 34 also includes an upwardly extending tube or spout 44 extending from the upper surface 41 of the actuator 34 and which defines a portion of the interior passageway 38 and the discharge port 40 of the actuator. As shown in FIGS. 3A and 4, the upwardly extending actuator spout 44 is preferably integrally formed in the actuator 34 but can alternatively be a separate member attached to the actuator body as will be apparent. The actuator spout 44 has an exterior diameter of a size to receive the interior of the first end 24 of the flexible conduit 19 in substantially fluid tight engagement. The conduit 19 is preferably fixedly attached to the stem 44 by various mechanical or chemical means such as by stapling; by applying an exterior clamp in the form of a metal or plastic ring shaped ferrule 45 to the exterior portion of the conduit overlying the actuator spout 19; by bonding or gluing; or by applying a heat shrinking treatment; etc. The actuator spout 44 thus provides a relatively straightforward and simple means for fixed attachment of the conduit 19 to the dispenser actuator such that the longitudinal axis 30 of the conduit 19 is oriented in a direction substantially parallel to the longitudinal axis 18 of the pressurized container 12.

FIG. 3B illustrates another embodiment of the invention in which the discharge port 40 of the actuator communicates with an interior passageway within the actuator through a portion of a sidewall 42 of the body of the actuator 34. In this embodiment of the invention, the actuator 34 further includes a separately or integrally formed tube or spout 50 connected at a first end 52 to the sidewall 42 of the actuator body. A portion of this actuator spout 50 extends laterally outwardly from the actuator 34 and connects to a second portion that extends upwardly to a second end 54. The second end 54 of the spout 50 is connected to the first end 24 of the flexible conduit 19 in the same manner as discussed above.

As will be seen from review of FIG. 3B, the longitudinal axis 30 of the flexible conduit 19 in this embodiment is also substantially parallel to the longitudinal axis 18 of the pressurized container 12; however, the axis 30 of the conduit is substantially offset radially from the longitudinal axis 18 of the container body 12. In comparison, in the embodiment of the invention shown in FIG. 3A, the conduit axis 30 substantially adjacent the axis 18 of the container body.

Yet another embodiment of the invention is illustrated in FIG. 3C. In this embodiment, the valve assembly 20 is preferably a tilt valve assembly having an upstanding valve stem. According to this embodiment of the invention, the first end 24 of the flexible conduit 19 is attached to the exterior of a tubular spout 55 forming an upper portion of a tilt valve actuator assembly 56. In this case, the longitudinal axis 30 of the conduit 19 extends substantially coaxially with the longitudinal axis 18 of the pressurized container 12. As illustrated by the arrows in FIG. 3C, the valve stem 21 of the tilt valve assembly 20 formed in the container body is moved from the closed position to the open position by the application of lateral pressure to an upper portion of the tilt valve actuator 56. While three specific dispensing actuators and embodiments of the invention have been illustrated in FIGS. 3A–3C, it will be apparent the other dispenser actuators and actuators can readily be used in accord with the invention. Moreover, tire products of the invention can also be constructed without use of an actuator body separate from the conduit 19. Thus, for example, the conduit can be modified for attachment directly to the valve stem of a container valve assembly, such as a tilt valve assembly, so that the application of manual lateral pressure to the container end of the conduit will actuate the valve assembly of the container independently of the step of connecting the conduit to the valve stem of a tire.

As seen in each of FIGS. 1–5B, the second end 26 of the flexible conduit 19 preferably terminates in a valve coupling 58. The valve coupling 58 is constructed for attachment to a conventional valve stem 27 of the tire 28, and is normally a Schrader valve coupling. As will be apparent, this coupling can take various forms and thus can attach to the valve stem of a tire via threads formed in the interior of the coupling, by a snap-on mechanism or in various other ways as will be apparent to those of skill in the art. As will also be apparent, the coupling normally includes a valve depressor for the valve of the tire.

Use of the tire inflator products of the invention described above is normally initiated by the step of attaching the second end 26 of conduit 19, via the valve coupling 58, to the valve stem 27 of a tire 28. Then in a separate step the valve assembly 20 is opened by the application of external force to the valve assembly actuator. This releases the contents of the container 12 into the flexible conduit 19 and then into the tire 28. Thus actuation of the valve assembly 20 of the tire inflating apparatus is independent of the step of connecting the valve coupling 58 of the flexible conduit 19 to the valve stem 27 of the tire 28.

As seen in FIG. 2, the tire inflating product 10 of the invention can also include a covering cap 66 mounted onto the top end 14 of the container body 12. The cover 66 encloses the actuator 34 and the flexible conduit 19 thereby preserving the integrity of the tire inflating product 10 during shipment, display, sale, and storage thereof. In embodiments of the invention wherein the conduit is offset coaxially form the axis of the container body, the offset is preferably minimized sufficiently so that the conduit extends upwardly within a cylindrical space above the container body defined by extension of the cylindrical container wall. This allows the application of a covering cap as discussed above. The cover cap can attach to the rim of the container body or can be attached directly to a ledge 67 the actuator body 34. Attachment of the cover cap to the actuator body can be particularly desirable in the event that the conduit 19 is highly flexible, configured in an unusual shape, or has other attributes that might interfere with automated sorting of the actuator. In such instances the cover cap can be preassembled to the actuator body over the conduit 19 and the resultant assemblies can be sorted and attached to container bodies during the manufacturing operation as discussed below.

As illustrated in FIGS. 5A and 5B, tire inflating products 10 of the invention can include a dip tube 62 extending into the pressurized container 12 from the valve assembly 20. The dip tube 62 is fluidly connected to a lower portion of the valve stem 21 via portions of the valve assembly 20 not specifically shown. As will be apparent, the contents of the pressurized container 12 are forced through the dip tube 62 by the pressure in the container body, upon actuation of the valve assembly 20.

The dip tube 62 has a predetermined length which defines either an upright or an inverted operating position for the tire inflator product. In the embodiment illustrated in FIG. 5A, the tire inflator product is designed for use in an upright operating position because the dip tube 62 is relatively long and extends into the lower portion of the container body 12. Thus, condensed gas and sealant are removed from the lower portion of the container body 12 when the valve assembly 20 is opened and the pressurized container 12 is maintained in a generally upright position.

FIG. 5B illustrates a tire inflating product designed for use in a preferred inverted operative position. In this embodiment, the dip tube 62, shown in phantom, is either relatively short and extends only into the upper portion of the pressurized container 12, or can be eliminated altogether. In these constructions, inversion of the container 12 results in immersion of the terminating end of the dip tube, or the valve of the container body, respectively, within the liquid contents, and not the headspace 64, of the container. Thus, when the container 12 is inverted and the valve assembly 20 is actuated, condensed gas and sealant are dispensed from the container. Use of the container in the inverted position as illustrated in FIG. 1 allows, in many cases, use of the tire inflator without requiring squatting or kneeling by the consumer, and can also minimize or eliminate wrist cramping and finger fatigue as are often associated with the conduit-type dispensers which are designed for use in the upright position.

FIGS. 6A and 6B are cross-sectional views of another tire inflating apparatus of the invention constructed for effective use in either an upright or inverted position. In this embodiment, an intermediate length dip tube 62 is used in combination with a substantially stratified inflator and sealant composition 70. Thus the inflator and sealant composition 70 is seen as a substantially stratified liquid having an upper strata or layer 72 and a lower strata or layer 74. The sealant portion of the composition is a composition of lower density than the propellant in the lower strata 74 and is also substantially insoluble or immiscible in the propellant and thus migrates to an upper position above the propellant. For example, use of a propellant in the form of condensed 1,1,1,2-tetrafluoroethane gas, i.e., R-134a as an inflator-propellant, together with an aqueous latex sealant, without use of substantial amounts of a mixing promoting agent can result in substantial or complete stratification of the propellant and the sealant into separate strata as illustrated.

Although such stratification could normally cause various problems, the intermediate length dip tube 62 used in the present invention terminates in a central portion of the container 12, preferably in a portion of the container body between one-fourth and three-fourths of the container height. In this location, the end of the dip tube is either within or relatively close to the sealant layer 72 regardless of the container orientation as generally seen in FIGS. 6A and 6B. Accordingly when the contents of the container are released by actuation of actuator 34, the sealant in the upper layer 72 is expelled from the container during an early phase of the discharge process regardless of container orientation.

The early discharge of the sealant layer is believed to improve distribution of the sealant within the interior of the tire in many cases and also to minimize the possibility that substantial amounts of sealant might uselessly remain in the container after the propellant has been fully discharged from the container. In addition the separate phases can boil and bubble rapidly within the container to create a foam-like mixture as the materials are discharged from the container. Use of the intermediate length dip tube improves contact between the foam-like mixture and the end of the dip tube so that this mixture, and not just propellant gas, is discharged from the container. This construction can thus minimize or eliminate the need to add costly additives to improve mixing of the sealer and propellant inflator. It is contemplated that effective dispensing of the inflator and sealant composition can be even further improved in some cases by employing an intermediate length dip tube having an inside diameter substantially in excess of the standard 0.125 inch dip tube inside diameter, e.g., a dip tube having an inside diameter the same or larger than dip tubes commercially available as "large" or "jumbo" dip tubes, and having inside diameters of 0.194 in. or 0.260 in., respectively.

FIGS. 6A and 6B also illustrate advantageous container bodies 12 for use with high pressure propellant inflator compositions, preferably non-flammable, non-ozone depleting propellant compositions, such as those disclosed in the previously mentioned U.S. Pat. No. 5,124,395, issued June 23, 1992 to Abramowski and Wells, which is hereby incorporated herein in its entirety by reference. These container bodies are defined in DOT exemption DOT-E 10232 issued Oct. 23, 1990, and renewed Sep. 4, 1992, and are commercially available from The Sexton Can Company, Cambridge, Mass. In general, the container bodies have a minimum wall thickness of 0.008 in and otherwise meet the requirements of DOT Specification 2Q (Title 43, Code of Federal Regulations) except that the metal container bodies have a volume of 33 cubic inches or less, a diameter of 3 inches or less, and have a construction capable of providing a burst pressure of at least about 370 psig; however, the container is fitted with a pressure relief device, such as a rupturable metal plug 80 (FIGS. 6A and 6B) having a burst pressure of about 250 psig or less, so that the burst pressure of the container is determined by the lower burst pressure of the pressure relief device. These container bodies can accordingly be used to package a tire sealant inflator composition having an effective vapor pressure above 180 psig at 130° F., without bursting of the container body. If the pressure within the container exceeds 250 psig, rupture of metal plug 80 releases the container contents while avoiding bursting of the main container body.

Use of these container bodies according to the present invention allows the elimination or a substantial decrease in the need for vapor pressure depressant additives. These vapor pressure depressants are generally solvents having no practical application once the propellant sealant composition is injected into a flat tire. These additives are costly and in some cases are environmental contaminants so that their elimination is desirable.

Although inert, non-ozone depleting propellant compositions such as Refrigerant 134a are typically poor solvents and thus do no mix well with sealant, preferably these propellants and these container bodies are used in combination with the intermediate length dip tube constructions of the invention, discussed above. Accordingly, a water-based sealant which is either not dissolved in, or is poorly mixed with the propellant, is readily dispensed from the container.

The portable tire inflating products 10 of the invention can be assembled and packaged using fully automated or semi-automated apparatus. Preferably, dispensing actuators are supplied to the manufacturing operation as unit assemblies which each include an actuator body, and an attached flexible conduit 19 oriented in a direction facing away from the bottom of the actuator. Because the orientation of the short conduit is in a direction opposite to the orientation of the bottom face of the dispensing actuator, sorting of a plurality of the actuators into a predetermined orientation relationship, e.g., axially aligned or axially parallel, results in orientation of the dispensing actuators in the proper direction for attachment to filled container bodies. The actuators can be oriented by hand on a moving conveyor, or an automatic sorting apparatus can be used. In either case, the dispensing actuator 34 including the attached flexible conduit 19 can delivered to apparatus which automatically mounts the actuator onto the top end 14 of the container body 12 which has been filled with a predetermined amount of tire inflating composition and sealed with a valve assembly. The assembled tire inflating products 10 can then be capped if desired, and then packaged automatically. Even when manual steps are used for orienting of the dispenser actuators, substantial manufacturing savings will be realized since the actuators are attached to the container bodies automatically and other manual steps can be eliminated if desired.

Alternatively, product assembly and packaging can be automatically carried out by employing a dispensing actuator assembly in which the short conduit is attached to the actuator body and wherein a protective cap is preassembled onto the actuator body in overlying relation to the conduit. As is well known in the art, various fully automated or semi-automated apparatus are commercially available for axial sorting and/or aligning of actuators preassembled with a protective cap. Such apparatus can readily be used to assemble tire inflator products of the invention.

Various tire inflating gasses and sealant compositions can be used in the tire inflator products of the invention. Thus the sealant can be a water based latex composition or a solvent based composition as will be apparent. The inflating gas is preferably a non-ozone depleting material and is also preferably non-flammable. Various stabilizers and additives can also be incorporated into the compositions. Preferred inflator sealant compositions are disclosed in U.S. Pat. No. 5,124, 395, issued Jun. 23, 1992. These inflator and sealant compositions are both non-flammable and non-ozone depleting. In preferred embodiments, these compositions include the combination of condensed 1,1,1,2-tetrafluoroethane gas (also called 134a) as an inflator-propellant, an aqueous latex sealant, and a vapor point depressant that effectively lowers the vapor pressure of the condensed gas in the container.

Various other inflating and sealant compositions preferred for use in the tire inflating products of the invention are set forth below (the percentages are calculated based upon total weight of the composition). When packaged in a DOT 2P or 2Q container, the following formulations preferably include a vapor pressure depressing amount of butyl cellosolve or the like in addition to the ingredients specifically listed. The formulations can be used without vapor pressure depressant additives when packaged according to the invention in the DOT-E 10232 container bodies discussed previously.

Formulation 1

21.8% methylene chloride;
45.5%perchloroethylene;
2.7% structural urethane (sold by Lord Chemical under the trade name AD5921-05);
1.9% balsamic liquid rosin ester (sold under the trade name Staybilite ester by Hercules Chemicals);
1.1% hydrocarbon resin (available from Arizona Chemical under the trade name Sta Tac B); and
27.0% propellant 134a.

Formulation 2

68.1% perchloroethylene;
2.5% acrylic resin (available from Rohm and Haas Chemical under the trade name Acryloid B72);
1.8% balsamic liquid rosin ester; and
27.6% propellant 134a.

Formulation 3

68.1% perchloroethylene;
2.5% hydrocarbon resin (available from Hercules Chemicals under the trade name Piccopale 110);
1.8% balsamic liquid rosin ester; and
27.6% propellant 134a.

Formulation 4

45.5% methylene chloride;
22.5% perchloroethylene; 1.3% styrene/butadiene copolymer crosslinked with divinyl benzene (available from Ameripol Synpol Company under the trade name B1009);
1.3% polymerized resin (available from Hercules Chemicals under the trade name Polypale);
1.3% balsamic liquid rosin ester; and
27.6propellant 134a.

Formulation 5

71.0% perchloroethylene;
0.2% styrene/butadiene copolymer crosslinked with divinyl benzene; and
28.8% propellant 134a.

Formulation 6

70.9% perchloroethylene;
0.4% styrene/butadiene copolymer crosslinked with divinyl benzene; and
28.7% propellant 134a.

Formulation 7

68% perchloroethylene;
2.5% acrylic resin;
1.8% rosin acid esters (available from Arizona Chemical under the trade name Ester 25); and
27.7% propellant 134a.

Formulation 8

68.0% perchloroethylene;
2.5% acrylic resin;
1.8% pentaerythritol tetrastearate (available from Henkel Corporation under the trade name Loxiol HOB7119PIN); and
27.7% propellant 134a.

Formulation 9

68.0perchloroethylene;
2.5% acrylic resin;
1.8% pentaerythritol tetrapelargonate (sold by Henkel Corp. under trade name Emerest 2486A);
27.7% propellant 134a.

Formulation 10

67.2% perchloroethylene;
2.1% terpene resins (available from Hercules Chemicals under the trade name P-C135);
1.7% pentaerythritol tetrastearate;
1.7% of hydrocarbon resin, and
27.3% of propellant 134a.

Formulation 11

67.2% perchloroethylene;
2.1% hydrocarbon resins;
1.7% of pentaerythritol tetrastearate;
1.7% hydrocarbon resin; and
27.3% propellant 134a.

Formulation 12

67.2% perchloroethylene;
2.1% beta-pinene polymer (available from Hercules Chemicals under the trade name P-5115);
1.7% pentaerythritol tetrastearate;
1.7% hydrocarbon resin; and
27.3% propellant 134a.

Formulation 13

68.0% perchloroethylene;
2.5% hydrocarbon resin;
1.8% glycerol ester of hydrogenated rosin (available from Hercules Chemicals under the trade name Foral 85); and
27.7% propellant 134a.

Formulation 14

68.0% perchloroethylene;
2.5% hydrocarbon resin (available from Hercules Chemicals under the trade name Piccotex LC);
1.8% glycerol ester of hydrogenated rosin; and
27.7% propellant 134a.

Formulation 15

Latex sealant, water, ammonia, ethylene glycol, and R-134a propellant.

Formulation 16

Perchloroethylene, adhesive, R-134a propellant.

Formulation 17

Latex sealant, water, ammonia, propylene glycol, and R-134a propellant.

Formulation 18

Latex sealant, water, ammonia, glycol, and a tire inflating propellant comprising one of the following or a mixture thereof; fluorinated propane, fluorinated methane, HCFC 23 and HFC 32.

Formulation 19

Latex sealant, water, ammonia, glycol, and a tire inflating propellant comprising one of the following; HCFC 125, 143a, 152a and mixtures thereof that have a pressure of about 70 psig when packaged in a sealed container as a condensed gas.

The above formulations are not intended to be an exhaustive listing of compositions comprising a condensed tire inflating gas and sealant. Thus numerous other such compositions can be employed in the tire inflating products of the invention.

Various changes can readily be made to the tire inflator products of the invention. For example, relatively short conduits having coiled, or other non-linear configurations, and which extend generally in the axial direction away from the discharge end of the container body, although not preferred, can be employed in accordance be employed in accordance with the invention. Locking mechanisms can be included to prevent unintended actuation of the valve mechanisms. Moreover, the relatively short conduits can be supplied in an unattached condition for later attachment by consumers to the discharge end of the containers.

The invention has been described in considerable detail with reference to its preferred embodiments. However, as indicated previously, the improved tire inflating products and their associated delivery systems of the present invention are susceptible to numerous alternatives and variations without departure from the spirit and scope of the invention as described in detail in the foregoing specification and defined in the appended claims.

That which is claimed is:

1. A tire inflating product comprising:

a container body containing a condensed tire inflating gas and a sealant, said container body having opposed ends and a longitudinal axis extending therethrough and further comprising a valve assembly forming at least a portion of a discharge end of said container body and being operable to release said condensed gas and sealant from said container body;

a flexible conduit having a length between about one inch and about six inches and being connected at a first end in fluid communication with said valve assembly of said container body and extending outwardly from the discharge end of said container in a direction substantially parallel to the longitudinal axis of said container body and terminating in a second end comprising a coupling adapted for attachment to the valve stem of a tire, said valve assembly being operable to discharge condensed gas and sealant from said container through said flexible conduit and said coupling independently of said coupling.

2. The tire inflating product of claim 1 further comprising an actuator operatively connected to said valve assembly for operation of said valve assembly independently of operation of the coupling on the conduit.

3. The tire inflating product according to claim 2 wherein flexible conduit and the actuator form portions of a unitary assembly.

4. The tire inflating product according to claim 3 wherein said actuator comprises an internal passageway through which the gas and sealant are discharged.

5. The tire inflating product according to claim 3 wherein said actuator includes an upper surface and sidewalls depending from the periphery of the upper surface to define a cavity therein for receiving said valve assembly.

6. The tire inflating product according to claim 5 comprising a port is defined through the upper surface of said actuator, and wherein said flexible conduit is attached to said actuator in fluid communication with the port.

7. The tire inflating product according to claim 5 comprising a port is defined through a sidewall of said actuator, and wherein said flexible conduit is attached to said actuator in fluid communication with the port.

8. The tire inflating apparatus according to claim 1 wherein said valve assembly comprises a tilt valve assembly.

9. The tire inflating product according to claim 1 wherein said valve assembly comprises a vertically acting valve assembly.

10. The tire inflating product according to claim 1 wherein said coupling is threaded for attachment to the valve stem of a tire.

11. The tire inflating product according to claim 1 further comprising a dip tube extending into said container from said valve assembly, said dip tube being of a predetermined length terminating in a longitudinally central portion of the container body independently of the liquid level of the condensed gas in the container.

12. The tire inflating product according to claim 1, wherein said condensed tire inflating gas and a sealant composition comprise the combination of condensed 1,1,1,2-tetrafluoroethane gas as an inflator-propellant, and an aqueous latex sealant.

13. The tire inflating product according to claim 1 further comprising a cover mounted on the first end of said pressurized container and enclosing said flexible conduit.

14. A dispenser actuator for delivering to a tire a condensed tire inflating gas and a sealant composition from the interior of a container maintaining the mixture under pressure comprising:
- an actuator including an actuator body having a bottom face oriented in a first direction for mounting on a discharge end of a container in operative association with a valve assembly of the container, said actuator body including a trigger adapted for actuation of said valve assembly and a port for discharging the contents of said container body;
- a flexible conduit having a length of between about one inch and about six inches and being attached to said actuator body at a first end in fluid communication with the port of said actuator body and extending outwardly from said actuator to in a direction substantially opposed to said first direction; and
- a tire valve coupling at the terminating end of said conduit and being adapted to discharge the contents of the container into a tire in response to the application of external pressure to said trigger.

15. The dispensing actuator according to claim 14 wherein said actuator includes an upper surface and sidewalls depending from the periphery of the upper surface and wherein said bottom face of said actuator body comprises a cavity defined by said upper surface and sidewalls of said actuator body.

16. The dispensing actuator according to claim 15 wherein the port is defined in the upper surface of said actuator body.

17. The dispensing actuator according to claim 15 wherein the port is defined in a sidewall of said actuator, and wherein said actuator further includes a tube connected at a first end to the port and extending outwardly from the sidewall of said actuator and upwardly to a second end, the second end of said tube being adapted for connection with the first end of said flexible conduit.

18. The dispensing actuator according to claim 15 wherein said coupling is threaded for attachment to the valve stem of a tire.

19. A tire inflating product comprising:
- a container body containing a composition in the form of a substantially stratified liquid comprising a condensed tire inflating gas and a sealant composition, said sealant composition being present primarily in an upper portion of said substantially stratified liquid;
- a valve assembly forming at least a portion of a discharge end of said container body and being operable to release said condensed gas and sealant from said container body;
- an actuator operable for actuating said valve assembly to discharge said condensed gas and sealant from said container; and
- a dip tube in the container body extending from the valve assembly of the container and having a predetermined length for terminating in a longitudinally central portion of the container independently of the liquid level of the condensed gas in the container so that liquid in the central portion of the container body is discharged during an early phase of the discharge process upon actuation of the valve assembly by the actuator.

20. The tire inflating product according to claim 19, wherein said container body is defined by opposed ends and a longitudinal axis extending therethrough, said product further comprising a flexible conduit attached at a first end to the discharge end of said container body in fluid communication with said valve assembly and extending outwardly from the discharge end of said container in a direction substantially parallel to the longitudinal axis of said container body and terminating in a second end comprising a coupling adapted for attachment to the valve stem of a tire.

21. The tire inflating product according to claim 20, wherein said condensed tire inflating gas and a sealant composition comprise the combination of condensed 1,1,1, 2-tetrafluoroethane gas as an inflator-propellant, and an aqueous latex sealant.

22. The tire inflating product according to claim 19, wherein said actuator is operable independently of the coupling on said conduit.

23. A tire inflating product comprising:
- a container body containing a condensed tire inflating gas and a sealant and having opposed ends defining a longitudinal axis extending therethrough and comprising a valve assembly forming at least a portion of a discharge end thereof operable to release said condensed gas and sealant from said container body;
- an actuator attached to said discharge end of said container body valve assembly and comprising a trigger positioned adjacent said valve assembly for actuation thereof;
- a conduit connected at a first end in fluid communication with said valve assembly of said container body and extending outwardly from the discharge end of said container in a direction defined by the longitudinal axis of said container body and comprising a tire valve stem coupling spaced form said first end of said conduit by a distance of between about 1.5 and about 5 inches,
- said actuator trigger being operable independently of said coupling to discharge condensed gas and sealant from said container through said flexible conduit and said coupling.

24. The tire inflating apparatus according to claim 23 wherein said valve assembly comprises a tilt valve assembly.

25. The tire inflating product according to claim 23 wherein said valve assembly comprises a vertically acting valve assembly.

26. The tire inflating product according to claim 23 wherein said conduit is a flexible conduit.

27. The tire inflating product according to claim 23 wherein said actuator comprises an internal passageway through which the gas and sealant are discharged.

28. The tire inflating product according to claim 23 further comprising a dip tube extending into said container from said valve assembly, said dip tube being of a predetermined length for removing the condensed gas and sealant from a longitudinally central portion of the container body independently of the liquid level of the gas in the container.

29. The tire inflating product according to claim 23, wherein said condensed tire inflating gas and a sealant composition comprise the combination of condensed 1,1,1, 2-tetrafluoroethane gas as an inflator-propellant, and an aqueous latex sealant.

30. A high pressure portable tire inflating product comprising:
- a metal container body having a volume of 33 cubic inches or less, a diameter of 3 inches or less, a minimum wall thickness of 0.008 in. and being fitted with a pressure relief device having a burst pressure of about 250 psig or less, said container body having a construction capable of providing a burst pressure of at least about 370 psig in the absence of said pressure relief device;

a high pressure tire inflator and sealant composition in said container body, said composition comprising a condensed, non-flammable, tire inflating gas and a sealant;

said container body further comprising a valve assembly forming at least a portion of a discharge end of said container body and being operable to release said condensed gas and sealant from said container body;

an actuator attached to said discharge end of said container body valve assembly adjacent said valve assembly for actuation thereof; and delivery means connected in fluid communication with said valve assembly of said container body for attachment to the valve stem of a tire for delivery of said tire inflating sealant composition thereto;

a dip tube extending into said container from said valve assembly and having a predetermined length for discharging liquid from a longitudinally central portion of said container independently of the liquid level of said condensed gas in said container;

wherein said tire inflating and sealant composition has a vapor pressure exceeding 180 psig at 130° F. and wherein when the pressure in said container exceeds 250 psig, said pressure relief device releases the container contents while avoiding bursting of the main container body.

31. The high pressure portable tire inflating product according to claim 30, wherein said condensed tire inflating gas and a sealant composition comprise the combination of condensed 1,1,1,25-tetrafluoroethane gas as an inflator-propellant, and an aqueous latex sealant.

32. The high pressure portable tire inflating product according to claim 30 wherein said delivery means comprises a flexible conduit connected at a first end in fluid communication with said valve assembly of said container body and extending outwardly from the discharge end of said container and terminating in a second end comprising a coupling adapted for attachment to the valve stem of a tire.

33. The high pressure portable tire inflating product according to claim 30 wherein said high pressure tire inflating and sealant composition comprises a tire inflating condensed gas selected from the group consisting of fluorinated propane, fluorinated methane, HFC 32, HCFC 125, 143a, 152a and mixtures thereof that have a pressure of about 70 psig when packaged in a sealed container as a condensed gas.

34. The high pressure portable tire inflating product according to claim 30 wherein said high pressure tire inflating condensed gas is a non-ozone depleting composition.

* * * * *

UNITED STATES PATENT AND TRADEMARK OFFICE
CERTIFICATE OF CORRECTION

PATENT NO. : 5,765,601
DATED : June 16, 1998
INVENTOR(S) : Wells et al.

It is certified that error appears in the above-identified patent and that said Letters Patent is hereby corrected as shown below:

On the title page, column 2, in the firm name, "and" should be --&--.

Column 20, line 6, "1,1,1,25-" should be --1,1,1,2---.

Signed and Sealed this

Twentieth Day of October, 1998

*Attest:*

BRUCE LEHMAN

*Attesting Officer*      *Commissioner of Patents and Trademarks*